Aug. 25, 1959 L. OSROW ET AL 2,901,213

VALVED FLOW CONTROL COUPLING

Filed Feb. 4, 1957

LEONARD OSROW
HAROLD OSROW
INVENTORS.

BY Abraham Friedman

ATTY.

United States Patent Office 2,901,213
Patented Aug. 25, 1959

2,901,213

VALVED FLOW CONTROL COUPLING

Leonard Osrow, Great Neck, and Harold Osrow, Roslyn, N.Y.

Application February 4, 1957, Serial No. 638,082

12 Claims. (Cl. 251—352)

This invention relates to a flow control means particularly adapted for use in conjunction with a conduit coupling device.

In the connection of conduits with each other coupling means are generally employed. It has been found desirable to incorparate valve or fluid control means in the coupling device in order to provide control of fluid flow therethrough. In certain applications, however, such fluid control means has presented serious difficulties. An example of such situation is that encountered where it is required that one of the conduits be capable of angular displacement with respect to the other. Thus, for example, water utilization appliances or tools are presently in common use wherein a source of water supply, such as a hose or flexible conduit is attached to a tool and wherein water is fed or dispensed through the tool or appliance in the course of its utilization. A typical example of this type of tool or appliance, and one of the situations to which this invention is particularly adapted, is a car washing or similar brush. Devices of this character comprise an elongated rigid pipe or tube, one end of which is connected to the washing device, the other end thereof being connected to a source of water supply, such as for example the usual flexible garden hose. Water is fed into the tube through the hose and is thence supplied to the washing head or brush of the device. A rigid pipe or tube acts as a handle for manipulating the tube and serves to conduct the water to the washing head. In some applications of this character it has been found particularly desirable to employ coupling means which permits axial displacement of the conduits from each other while maintaining the water tight sealed relation between the coupling means and the conduits. This axial displacement between the conduits has additionally aggravated the problem involved in providing an efficient combined coupling and flow control valve.

It is therefore an object of this invention to provide a combined coupling and flow control means or valve to be interposed between two conduits which is capable of maintaining said conduits in fluid tight connected relation while permitting the control of fluid flow therethrough.

Another object of this invention is to provide a device of the character indicated which is capable of controlling fluid flow by the manipulation of one of the conduit members.

It is an additional object of this invention to provide a device of the character indicated wherein the coupling means permits the axial displacement of the conduits from one another without effecting the fluid tight coupling therebetween and without permitting any leakage therefrom and which coupling means is capable of acting as a fluid control valve in spite of the axial displacement of said conduits from one another It is also an object of this invention to provide a combined coupling and fluid control means which is capable of being selectively operated to open or closed position without introducing any leakage into the coupling means and which forms an efficient shut-off for fluid flow when disposed in closed condition.

It is a further object of this invention to provide a coupling valve of the character indicated wherein an increase of fluid pressure aids in providing a more efficient shut-off between the conduits when disposed in closed or shut-off condition.

Another object of this invention is to provide a coupling valve of the character indicated which may be readily and efficiently manufactured in mass production and in which the parts need not be manufactured to excessively precise tolerances and which may be readily assembled at low cost.

Other and further objects, benefits and advantages of this invention will become apparent from the description thereof contained in the annexed drawings, specification and claims or will otherwise become obvious. It will be understood that the invention herein disclosed may be employed for other purposes for which the parts, structure and arrangement are adapted.

Figure 1:
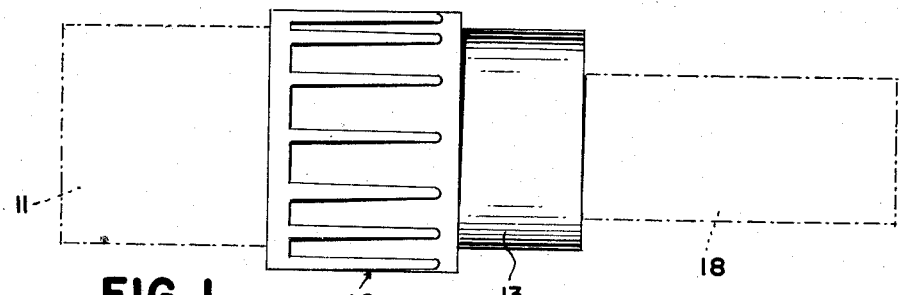
Figure 1 is a plan view of a coupling valve in accordance with the present invention showing conduits connected thereto in broken lines.
Figure 2:
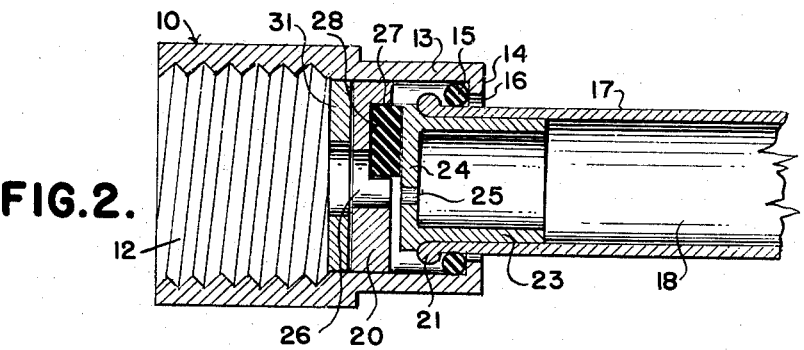
Figure 2 is a cross-section of Figure 1.

As shown in Figures 1 and 2 the instant coupling valve device designated generally by the numeral 10 comprises a hollow cylindrical body having a threaded portion 12 formed at one end thereof. Said threaded end portion 12 is adapted to receive a conventional complementary male thread of the end of a conduit 11. A washer 31 is provided in the interior of the coupling to form a fluid tight seal therewith. A sleeve 13 of reduced diameter extends from the threaded end portion 12 of the cylindrical body and an annular shoulder is formed at the juncture of said threaded end with the sleeve. Sleeve 13 terminates in an inwardly extending flange 14 which therefore forms a more restricted annular opening at the other or outlet end of the coupling valve. Positioned within sleeve 13 is a sealing ring 15 having a circular cross-section and bearing against the interior wall of said sleeve 13 in water tight engagement therewith. Sealing ring 15 is formed of an elastomeric or rubber-like material and advantageously comprises a rubber O ring. The diameter of the sealing ring 15 is such that the body of the ring extends beyond the peripheral edge of flange 14 and therefore overlies the annular opening 16 defined by said flange and the outer wall surface 17 of conduit 18. The numeral 18 represents a conduit, tube or pipe provided with an end termination disposed within sleeve 13 having an outwardly extending lip or bead 21. The outer diameter of tube 18 is smaller than the diameter of the peripheral edge of flange 14 so that it is spaced from the peripheral edge of said opening when the conduit 18 is positioned within the coupling as shown at 16. The inside diameter of sealing ring 15 is such that when tube 18 is inserted within the sleeve and through the annular opening, a compressive force is exerted upon said ring sufficient to form a water tight sealing contact between the outer surface of conduit 18 and also with the inner surface of the sleeve 13, the sealing ring 15 overlying the clearance space 16 between said flange 14 and said conduit. Conduit 18 terminates in a ferrule or cap 23 having a transverse wall 24 which is co-extensive with the cross-section of said conduit. Said wall is conveniently mounted across the end of conduit 18 by being formed as an integral part of cylindrical ferrule 23. The cylindrical cap or ferrule is secured within the end of conduit 18 as by means of a frictional pressed fit. Transverse wall 24 is provided with an aperture 25 extending therethrough to provide communication between the conduit and the coupling body. Aperture 25 is eccentrically disposed in the transverse wall 24 of the cylindrical ferrule 23 and is offset from aperture 26 as will more clearly appear hereinafter.

A plug 20 having an outer surface complementary to the inner surface of the sleeve is transversely disposed at the juncture of the sleeve with the threaded end portion and is similarly advantageously secured in position by a simple frictional pressed fit. A centrally disposed aperture 26 is provided through the body of plug 20 to permit water to pass therethrough. As may be more clearly seen from Figures 3 and 4, plug 20 is formed with a recess or depression 27 which, in the embodiment of the invention herein illustrated extends in chordal relation with respect to the circle defined by the plug. The recess 27 is disposed in confronting relation with respect to transverse wall 24. A portion of depression 27 extends diametrically across aperture 26 extending through the body of the plug. A diaphragm 28 is disposed within recess 27. Said diaphragm 28 is formed of an elastomeric material such as rubber and fits loosely within the recess 27 defined by shoulders 29. The diaphragm is of greater width than the depth of recess 28 and is so disposed as to extend across a portion of opening 26 formed in plug 20. As may be seen from Figures 2 and 3 the diaphragm is thus captured between the end of conduit 18, as defined by transverse wall 24, and plug 20. Said diaphragm is, therefore confined with respect to its movement in an axial direction and it is confined against lateral displacement by abutment shoulders 29 as well as by the sleeve wall. When the coupling and conduit 18 are in the relative positions, as illustrated in Figure 2, fluid flow from the coupling into the conduit is accomplished through the apertures 26 and 25. It should be noted that aperture 25 is offset from the diaphragm in that position. However, when conduit 18 is rotated with respect to the coupling to the position shown in Figure 3, the plane surface of the diaphragm 28 is brought into confronting relation with that portion of transverse wall 24 in which aperture 25 is provided and the diaphragm overlies said aperture. In this position fluid flow from the coupling into the conduit is consequently restricted. The water passing through aperture 26 strikes the portion of the diaphragm overlying a portion thereof and moves the diaphragm forward toward wall 24. The fluid pressure bearing against the surface of the free floating diaphragm forces the diaphragm into sealing contact with transverse wall 24 thereby effectively sealing off aperture 25 against fluid flow and acting as a shut-off valve between the coupling and the conduit. It should be noted from Figure 3 that although the coupling and conduit are rocked or axially displaced from one another the free floating character of the diaphragm and the clearances provided by the confining walls permit it to be brought into sealing contact with the surface of the transverse wall 24 and to assume an angular disposition parallel to said wall surface. It should further be noted that due to the elastomeric character of the rubber diaphragm said diaphragm may be compressed so as to effect substantial surface contact with the transverse wall and consequently seal off aperture 25. By slightly compressing the diaphragm the axial displacement of the conduit with respect to the coupling serves to more effectively shut off fluid flow between the parts. The shut off function of the coupling is thus accomplished by this simple relative rotation of the parts regardless of the degree of tilt applied to the conduit with respect thereto.

Some of the advantages of the foregoing invention may of course be realized by various modifications of the arrangement. Thus for example, one or more projecting studs or bosses may be formed upon the surface of the plug which are received in complementary openings on recesses formed in the body of the diaphragm. By providing similar clearance between the walls of openings in the diaphragm body, the diaphragm will be restricted in its ability to rotate with relation to the plug but will nevertheless be in floating relationship therewith so that the face of the diaphragm would be free to assume a position parallel with the plane of transverse wall 24 and would thus be capable of sealing contact therewith when it overlies the aperture therein. Another modified form of the invention may be to form projecting bosses on the face of the diaphragm in confronting relation with the plug, which is then provided with complementary dimples or openings allowing the requisite clearance and performing similar functions. In each case the diaphragm would be free for floating movement giving it adequate play to assume an angular position similar to the disposition of the transverse wall and to make sealing contact therewith while being confined against rotation in relation to the plug. It is significant that the conduit and body of the coupling device may be rotated with relation to each other as well as rocked or tilted without in any way affecting the seal between the coupling body and the conduit nor the effectiveness of the shut-off means.

Figure 3:
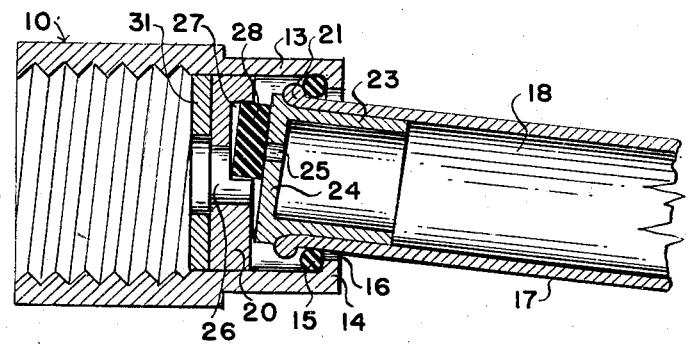
Figure 3 is a view similar to Figure 2 showing a conduit axially displaced or rocked with respect to the coupling valve; while in closed or shut off condition.
Figure 4:
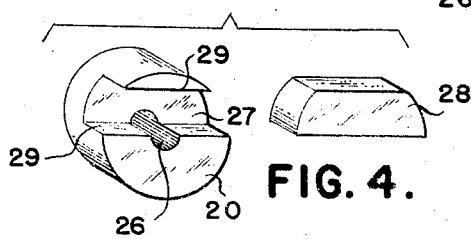
Figure 4 is an exploded view in perspective of the plug and diaphragm assembly.

In assembling the device the sealing ring 15 is inserted into the sleeve portion 13 of the coupling and thereupon the tube 18 is passed through annular opening 16. The entire assembly is then enclosed by means of transverse plug 20 after the diaphragm has been interposed therein. The plug prevents the withdrawal of the conduit from the coupling. The thickness of the plug is such that when seated, the inner surface thereof is spaced from the beaded end of the tube thereby providing a clearance space to permit the rocking movement or angular displacement of the conduit with respect to the coupling. This clearance space is partially occupied by the diaphragm. In view of the construction disclosed it will be apparent that the tube and coupling may be rotated relative to each other, the sealing ring acting as a bearing means and maintaining a water tight seal between the parts in spite of such rotation. It will be further apparent, as shown in Figures 2 and 3, that the coupling and the conduit may be rocked, tilted or angularly displaced so that their longitudinal axes assume an angle with respect to each other without impairing the water tight seal between the parts or effecting the shut-off action of the diaphragm. In this connection it should be noted that the outer peripheral wall of the tube rides upon the circular surface presented by the sealing ring and that the position of the diaphragm conforms itself to the surface of the transverse wall against which it abuts. It will also be apparent that the coupling valve may be selectively operated by simply rotating the conduit 18 with respect to the body of the coupling so as to bring aperture 25 into or out of registration with the body of the diaphragm.

We have here shown and described a preferred embodiment of our invention. It will be apparent, however, that this invention is not limited to this embodiment and that many changes, additions and modifications can be made in connection therewith without departing from the spirit and scope of the invention as herein disclosed and hereinafter claimed.

We claim:

1. A valved coupling device for interconnecting conduits and controlling the flow of fluid therethrough, comprising a hollow cylindrical body having end portions for receiving the ends of a pair of conduits respectively, one of said conduits being rotatably mounted within said body; means for controlling the flow of fluid through said body and between said conduits, said means comprising a transverse plug provided with an aperture therethrough disposed within said body between said end portions, said plug being provided with a recess in the face thereof in confronting relation with the end of said rotatable conduit, said recess being offset from said aperture; a diaphragm disposed in said recess, a transverse wall disposed across the end of said rotatable conduit provided with an aperture therethrough, said wall aperture being located so as to be brought into and out of registration with said diaphragm upon rotation of said rotatable conduit with respect to said body, so that said diaphragm overlies said wall aperture when it is in registration therewith and in sealing contact with respect to said wall.

2. A valved coupling device for interconnecting conduits and controlling the flow of fluid therethrough, comprising a hollow cylindrical body having end portions for receiving the ends of a pair of conduits respectively, one of said conduits being rotatably mounted within said body and tiltable with respect thereto, means for controlling the flow of fluid through said body and between said conduits, said means comprising a transverse plug provided with an aperture therethrough disposed within said body between said end portions, said plug being provided with a recess in the face thereof in confronting relation with the end of said tiltable conduit, said recess extending across a portion of said aperture, a diaphragm disposed within said recess, a transverse wall disposed across the end of said tiltable conduit provided with an aperture therethrough, said aperture being located so as to be brought into and out of registration with said diaphragm upon rotation of said rotatable conduit with respect to said body, so that said diaphragm overlies said aperture when it is in registration therewith and thereby shuts off fluid flow therethrough.

3. A valved coupling device for interconnecting conduits and controlling the flow of fluid therethrough, comprising a hollow cylindrical body having end portions for receiving the ends of a pair of conduits respectively, one of said conduits being rotatably mounted within said body and tiltable with respect thereto, means for controlling the flow of fluid through said body and between said conduits, said means comprising a transverse plug provided with an aperture therethrough disposed within said body between said end portions, said plug being provided with a recess in the face thereof in confronting relation with the end of said tiltable conduit, said recess extending across a portion of said aperture, a diaphragm moveably disposed within said recess and overlying said portion of said plug aperture, a transverse wall disposed across the end of said tiltable conduit provided with an aperture therethrough, said wall aperture being located so as to be brought into and out of registration with said diaphragm upon rotation of said rotatable conduit with respect to said body, so that said diaphragm overlies said wall aperture when it is in registration therewith and is moved into sealing contact with respect to said wall by the impingement thereon of the fluid through said plug aperture.

4. A valved coupling device for interconnecting conduits and controlling the flow of fluid therethrough, comprising a hollow cylindrical body having end portions for receiving the ends of a pair of conduits respectively, one of said conduits being rotatably mounted within said body and tiltable with respect thereto, means for controlling the flow of fluid through said body and between said conduits, said means comprising a transverse plug provided with an aperture therethrough fixedly disposed within said body between said end portions, said plug being provided with a recess in the face thereof in confronting relation with the end of said tiltable conduit, said recess extending across a portion of said aperture, a diaphragm moveably disposed within said recess and overlying said portion of said plug aperture, a transverse wall disposed across the end of said tiltable conduit located within said body, said diaphragm being confined for limited movement by the walls defining said recess in the plug and said transverse wall, said transverse wall being provided with an aperture therethrough so located as to be brought into and out of registration with said diaphragm upon rotation of said rotatable conduit with respect to said body, so that said diaphragm overlies said wall aperture when it is registration therewith and is moved into sealing contact with the face of said wall by the impingement thereon of the fluid through said plug aperture.

5. A valved coupling device for interconnecting conduits and controlling the flow of fluid therethrough, comprising a hollow cylindrical body having end portions for receiving the ends of a pair of conduits respectively, one of said conduits being rotatably mounted within said body and tiltable with respect thereto, means for controlling the flow of fluid through said body and between said conduits, said means comprising a transverse plug provided with an axial aperture therethrough fixedly disposed within said body between said end portions, said plug being provided with a recess in the face thereof in confronting relation with the end of said tiltable conduit, said recess being disposed in chordal relation with respect to the circumference of said plug and extending across a portion of said aperture, a diaghragm moveably disposed within said recess and overlying said portion of said plug aperture, a transverse wall disposed across the end of said tiltable conduit located within said body spaced from said plug and diaphragm, said diaphragm being confined for limited movement by the walls defining said recess in the plug and said transverse wall and having a planar surface in confronting relation with said wall, said transverse wall being provided with an aperture therethrough so located as to be brought into and out of registration with said diaphragm upon rotation of said rotatable conduit with respect to said body, so that said diaphragm overlies said wall aperture when it is in registration therewith and the planar surface of said diaphragm assumes a position parallel with the confronting surface of said wall and is moved into sealing contact therewith by the impingement thereon of the fluid through said plug aperture.

6. A valve coupling device for interconnecting a pair of conduits and controlling the flow of fluid therethrough, said device comprising a hollow cylindrical body having an end portion adapted to be connected to a conduit, a second conduit disposed within the other end portion of said body rotatable with respect thereto and in fluid tight sealing engagement therewith, a plug transversely disposed within said body between the terminal portions of said conduits, said plug being provided with an aperture therethrough to permit fluid flow between said conduits, said plug being further provided with a depression extending across at least a portion of the aperture formed therein, a diaphragm disposed within said depression, said diaphragm being confined for restricted movement by the walls of said depressed area, a transverse wall disposed across the terminal portion of said second conduit located within said body additionally confining said diaphragm, said wall being provided with an aperture therethrough offset from the aperture provided in said plug, said aperture being disposed so as to be brought into and out of confronting relation with respect to said diaphragm by the rotation of said second conduit.

7. A coupling device for interconnecting a tube with a hose, said coupling device comprising a hollow cylindrical body having an internally threaded end adapted to be engaged with the complementary threaded end of a fitting on said hose, a sleeve of reduced diameter extending from said threaded end, an inwardly extending flange provided at the outer end of said sleeve defining an annular opening in the other end of said coupling, a sealing ring of rubber-like material positioned within said sleeve adjacent said flange and in water tight sealing contact with the inner wall surface of said sleeve, a tube extending within said sleeve, an end of said tube having an outwardly extending bead formed thereon, said bead being of larger diameter than said annular opening, the outer diameter of said tube being smaller than the inner diameter of said flange whereby a clearance space is formed between the peripheral edge of said flange and the outer surface of said tube to permit said tube to be rocked with respect to said sleeve, said tube being in water tight sealing engagement with said sealing ring; a transverse plug positioned within said sleeve at the juncture of said threaded end with said sleeve to prevent the retraction of said tube from said sleeve, said plug being spaced from the beaded end of said tube a distance sufficient to permit said tube to be rocked with respect to said sleeve; said transverse plug being provided with an aperture to permit the passage of water therethrough whereby said tube is free for rotation with respect to said hollow body and may be rocked with respect thereto without disturbing the water tight character of said seal, a transverse wall disposed across the terminal portion of said tube provided with an aperture therethrough offset from the aperture in said plug, said plug being further provided with a depression in the surface thereof in confronting relation with said tube said depression extending across a portion of the aperture therein, a diaphragm disposed within said depression the aperture in said wall being so located as to be brought into and out of registration with said diaphragm upon the rotation of said tube with respect to said body so that said diaphragm may be selectively disposed over the aperture in said tube wall and in sealing relation therewith.

8. A coupling device for interconnecting a tube with a hose, said coupling device comprising a hollow cylindrical body having an internally threaded end adapted to be engaged with the complementary threaded end of a fitting on said hose, a sleeve of reduced diameter extending from said threaded end, an inwardly extending flange provided at the outer end of said sleeve defining an annular opening in the other end of said coupling, a sealing ring of rubber-like material positioned within said sleeve adjacent said flange and in water tight sealing contact with the inner wall surface of said sleeve, a tube extending within said sleeve, an end of said tube having an outwardly extending bead formed thereon, said bead being of larger diameter than said annular opening, the outer diameter of said tube being smaller than the inner diameter of said flange whereby a clearance space is formed between the peripheral edge of said flange and the outer surface of said tube to permit said tube to be rocked with respect to said sleeve, said tube being in water tight sealing engagement with said sealing ring, a transverse plug positioned within said sleeve at the juncture of said threaded end with said sleeve to prevent the retraction of said tube from said sleeve, said plug being spaced from the beaded end of said tube a distance sufficient to permit said tube to be rocked with respect to said sleeve, said transverse plug being provided with an aperture to permit the passage of water therethrough whereby said tube is free for rotation with respect to said hollow body and may be rocked with respect thereto without disturbing the water tight character of said seal, said plug being further provided with a recess in the face thereof in confronting relation with the end of said tube, said recess extending across a portion of said aperture, a diaphragm moveably disposed within said recess and overlying said portion of said plug aperture, a transverse wall disposed across the end of said tube located within said body said diaphragm being confined for limited movement by the walls defining said recess in the plug and said transverse wall, said transverse wall being provided with an aperture therethrough so located as to be brought into and out of registration with said diaphragm upon rotation of said tube with respect to said body, so that said diaphragm overlies said wall aperture when it is in registration therewith and is moved into sealing contact with the face of said wall by the impingement thereon of the fluid through said plug aperture.

9. A coupling device for interconnecting a tube with a hose, said coupling device comprising a hollow cylindrical body having an internally threaded end adapted to be engaged with the complementary threaded end of a fitting on said hose, a sleeve of reduced diameter extending from said threaded end, an inwardly extending flange provided at the outer end of said sleeve defining an annular opening in the other end of said coupling, a sealing ring of rubber-like material positioned within said sleeve adjacent said flange and in water tight sealing contact with the inner wall surface of said sleeve, a tube extending within said sleeve, an end of said tube having an outwardly extending bead formed thereon, said bead being of larger diameter than said annular opening, the outer diameter of said tube being smaller than the inner diameter of said flange whereby a clearance space is formed between the peripheral edge of said flange and the outer surface of said tube to permit said tube to be rocked with respect to said sleeve, said tube being in water tight sealing engagement with said sealing ring, a transverse plug positioned within said sleeve at the juncture of said threaded end with said sleeve to prevent the retraction of said tube from said sleeve, said plug being spaced from the beaded end of said tube a distance sufficient to permit said tube to be rocked with respect to said sleeve, said transverse plug being provided with an aperture to permit the passage of water therethrough whereby said tube is free for rotation with respect to said hollow body and may be rocked with respect thereto without disturbing the water tight character of said seal, said plug being provided with a recess in the face thereof in confronting relation with the end of said tube, said recess being disposed in chordal relation with respect to the circumference of said plug and extending across a portion of said aperture, a diaphragm moveably disposed within said recess and overlying said portion of said plug aperture, a transverse wall disposed across the end of said tube located within said body spaced from said plug and diaphragm, said diaphragm being confined for limited movement by the walls defining said recess in the plug and said transverse wall and having a planar surface in confronting relation with said wall, said transverse wall being provided with an aperture therethrough so located as to be brought into and out of registration with said diaphragm upon rotation of said tube with respect to said body so that said diaphragm overlies said wall aperture when it is in registration therewith and the planar surface of said diaphragm assumes a position parallel with the confronting surface of said wall and is moved into sealing contact therewith by the impingement thereon of the fluid through said plug aperture.

10. A valved coupling device for interconnecting conduits and controlling the flow of fluid therethrough, comprising a hollow body having end portions for receiving the ends of a pair of conduits respectively, at least one of said conduits being mounted for rotation with respect to said body, an apertured transverse wall disposed across the end of said rotatable conduit, an apertured transverse plug disposed within said body in juxtaposition with said wall being provided with a recess which intersects said plug aperture, a floating diaphragm disposed between said wall and said plug, and confined for limited movement in said recess, the said diaphragm being selectively disposed in sealing relation with respect to the aperture in said wall upon the rotation of said rotatable conduit.

11. A valved coupling device for interconnecting conduits and controlling the flow of fluid therethrough, comprising a hollow body having end portions for receiving the terminal portions of a pair of conduits respectively, said body and at least one of said conduits being relatively rotatable, an apertured transverse wall disposed across the terminal portion of said one conduit, an apertured transverse plug disposed within said body in confronting relation with said wall and spaced therefrom, the aperture in said wall being offset from the aperture in said plug, said plug being provided with a recess which intersects said plug aperture, a floating diaphragm disposed in the space between said wall and said plug confined for limited movement in said recess and adapted to be selectively brought into registration with the aperture in said wall upon relative rotation between said body and said one conduit to thereby shut off the flow of fluid therethrough, and to permit such flow when brought out of registration therewith.

12. A valved coupling device for interconnecting a pair of conduits and controlling the flow of fluid therethrough, said device comprising a hollow cylindrical body having a terminal portion adapted to be connected to a conduit, a second conduit having a terminal portion disposed within the other end portion of said body, said body and second conduit being relatively rotatable and in fluid tight sealing engagement with each other, a plug transversely disposed within said body between the terminal portions of said conduits, said plug being provided with an aperture therethrough to permit fluid flow between said conduits, a transverse wall disposed across the terminal portion of said second conduit located within said body, a diaphragm disposed intermediate said plug and said wall and confined for limited axial movement therebetween, means associated with said plug and complementary means associated with said diaphragm for restricting the degree of radial displacement of said diaphragm, said wall being provided with an aperture therethrough offset from the aperture provided in said plug, said aperture being disposed so as to be brought into and out of confronting relation with respect to said diaphragm by the relative rotation of said body and second conduit.

References Cited in the file of this patent

UNITED STATES PATENTS

| | | |
|---|---|---|
| 642,807 | Smith | Feb. 6, 1900 |
| 2,467,911 | Reilly | Apr. 19, 1949 |